United States Patent [19]

Wharton et al.

[11] 4,395,737
[45] Jul. 26, 1983

[54] VIDEO DISC SLOW DOWN PROCESSOR WITH REVERSE COLOR DETECTOR/CORRECTOR

[75] Inventors: James H. Wharton; Jack E. James, both of Indianapolis, Ind.

[73] Assignee: RCA Corporation, New York, N.Y.

[21] Appl. No.: 215,187

[22] Filed: Dec. 11, 1980

[51] Int. Cl.³ .................... H04N 9/491; H04N 5/78
[52] U.S. Cl. ............................. 358/312; 360/10.1
[58] Field of Search ............ 358/4, 8, 17, 19, 21 R, 358/21 V, 312; 360/10, 11, 10.1, 11.1

[56] References Cited

U.S. PATENT DOCUMENTS

| | | | |
|---|---|---|---|
| 3,564,123 | 2/1971 | Pezirtzoglov | 178/5.4 |
| 4,007,486 | 2/1977 | Inaba et al. | 358/13 |
| 4,044,379 | 8/1977 | Halter | 358/128 |
| 4,109,276 | 8/1978 | Hopkins, Jr. et al. | 358/19 X |
| 4,121,242 | 10/1978 | Janko | 358/8 X |
| 4,133,009 | 1/1979 | Kittler et al. | 360/9 |
| 4,145,705 | 3/1979 | Yoshinaka | 358/19 X |
| 4,216,504 | 8/1980 | Boussina et al. | 360/10 X |
| 4,277,796 | 7/1981 | Ross | 358/8 |
| 4,335,393 | 6/1982 | Pearson | 358/4 |

OTHER PUBLICATIONS

Multifunction Digital Video Processor; SMPTE's 14th Television Conference, Feb. 1-2, 1980, Toronto, Ont., Digital Video, vol. 3.

Primary Examiner—Aristotelis M. Psitos
Attorney, Agent, or Firm—E. M. Whitacre; J. S. Tripoli; R. G. Coalter

[57] ABSTRACT

Selected fields of a redundant field slow motion video tape reproduced video signal are stored in a memory at a given clock rate and recovered from the memory at a clock rate inversely proportional to the number of times each field is repeated so as to produce a non-redundant video output signal of reduced bandwidth yet processing the full informational content of the original video signal. The original signal normally exhibits an ordered color field sequence but is subject to anomalous variations from time to time which causes anomalous variation of the chrominance-burst phase relationship of the video output signal. A detector, responsive to a change of a parameter of the video input signal, detects the anomalous variations of the chrominance-burst phase relationship and produces a control signal that is applied to a circuit which effectively reverses the phase relationship of the chrominance and color burst components of the video output signal of the memory when the control signal is present.

4 Claims, 1 Drawing Figure

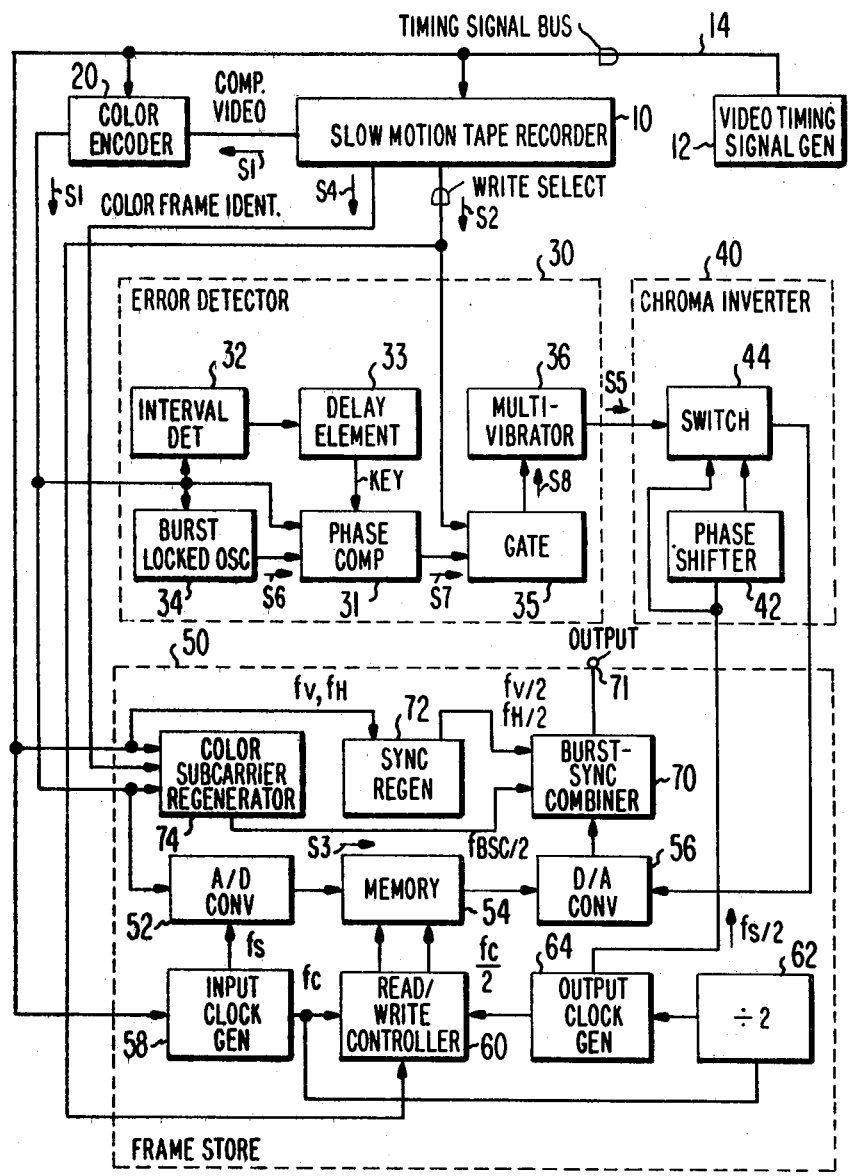

VIDEO DISC SLOW DOWN PROCESSOR WITH REVERSE COLOR DETECTOR/CORRECTOR

This invention relates to video signal processors and particularly to video signal slow down processors of the kind for producing video signals at less than 37 "real time" rates which may advantageously be used in electromechanical video disc mastering applications.

In electromechanical mastering of video disc records the very high information density involved would require the use of a cutterhead of exceptionally wide bandwidth if the mastering were to be done in real time. Cutterhead requirements become less stringent if the recording is done at less than real time rates by reducing the mastering turntable speed and proportionally reducing the recording signal bandwidth. A slow down processor which effects a reduction of bandwidth without loss of the informational content of the slowed down signal is disclosed in the copending U.S. Patent Application of M. D. Ross entitled "SLOW DOWN PROCESSOR FOR VIDEO DISC MASTERING", Ser. No. 087,452 filed Oct. 22, 1979, which issued July 7, 1981, as U.S. Pat. No. 4,277,796 and is incorporated herein by reference.

In the Ross apparatus, a tape recorder produces a redundant field video signal, each field being produced at a rate corresponding to the rate at which it was originally recorded. A selected field of each set of redundant fields is written into a memory at a given clock rate and the stored fields are read from the memory at a lesser clock rate, the ratio of the clock rates being predetermined in accordance with the redundancy level of the redundant field video signal.

It is desirable in practicing the Ross invention to store only those portions of the selected fields which are representative of picture information and to regenerate repetitive video signal components (e.g., color burst and horizontal sync) at the output of the storage unit thereby substantially reducing the storage requirements. Video storage units having such a feature are commercially available. One example is the type TFS-121 frame synchronizer.

It has been found in practicing the Ross invention that the normally ordered chrominance-burst phase relationship of the video signal produced by the tape recorder may be subject to anomalous variations from time to time. This problem can lead to a condition wherein the phase relationship of the stored chrominance and regenerated burst components of the video signal produced by the frame store may become reversed. This condition, referred to hereinafter as a "phase flip", can have the effect of reversing the hue of the slowed down video signal produced by the frame store during fields when the aforementioned anomalies occur.

It has been found, for purposes of video disc mastering, that the problem of random fields having reverse color (i.e., a phase flip) is very objectionable and this problem is greatly accentuated when the finished record is played back in a still frame or slow motion mode. The present invention is directed to meeting the need for a slow down processor suitable for video disc mastering and in which the incidence of phase flips of the slowed down video output signal is substantially reduced.

A slow down processor, in accordance with the invention, comprises tape recorder means operable in a slow motion playback mode for producing a redundant field composite video signal comprising sequential sets of fields, each field being produced at a standard field rate, each set of fields comprising a predetermined number of similar fields, each field normally having a predetermined chrominance-burst phase relationship but being subject to anomalous variations. A frame storage means, responsive to the redundant field video signal and to a control signal produced by the tape recorder means, stores a selected field of each set of fields and reproduces the stored selected fields at a field rate less than the standard field rate to provide a nonredundant field video output signal of reduced bandwidth. The frame storage means is of a type in which the color burst component of the composite video signal supplied thereto is not stored but is regenerated by color subcarrier regenerator means and added by adder means to the reproduced video output signal. Detector means, responsive to a signal manifestation produced by the tape recorder means, detects the anomalous variations of the chrominance-burst phase relationship of the redundant field composite video signal and produces a control signal. The control signal is applied to circuit means which effectively reverses the phase relationship of the chrominance and regenerated color burst components of the video output signal of the frame store when the control signal is present.

The sole FIGURE is a block diagram of a slow down processor embodying the invention.

The slow down processor comprises a slow motion tape recorder 10, a color encoder 20, an error detector 30, a chroma phase inverter 40 and a video frame storage unit 50. Video timing and color reference signals for synchronizing operation of the recorder, encoder, and frame store are provided by a video timing signal generator 12 via a timing signal bus 14. A generator suitable for producing NTSC format standard video timing signals is the Tektronix Model 146 NTSC Test Signal Generator. (For processing signals in other formats such as PAL an appropriate generator should be used).

Recorder 10 is preferably of the non-segmented helical scan type such as the Ampex Corporation Model VPR-1 or VPR-2 Video Production Recorders. In such machines the video pickup head is servo controlled for movement in two planes within the video scanning drum. This feature, known as automatic scan tracking (AST), enables the video head to repeatedly scan a given field recorded on the tape before advancing to the next field. In the slow motion operating mode the tape speed of the recorder is reduced in proportion to the number of times each field is scanned and the video head velocity is mantained at its normal value so that redundant (i.e., repeated) fields are produced at the normal field rate (about 60 fields per second in the NTSC system).

The redundant field normal rate (60 fields/second) composite video signal S1 produced by recorder 10 is translated to buried subcarrier format (BSC) prior to selective storage in frame store 50 by means of color encoder 20. In the buried subcarrier format (described by Pritchard in U.S. Pat. No. 3,872,498) chrominance information is represented by a color subcarrier of the general form employed in the well known NTSC format but is buried in a lower portion of the video band rather than being located in the high end of the luminance signal band. An illustrative subcarrier frequency choice for encoding of NTSC format signals is in the vicinity of 1.53 MHz with color sidebands extending 500 KHz thereabout and with the luminance signal band extending well above the highest color subcarrier frequency (to 3 MHz, for example). The Pritchard patent discloses suitable arrangements for implementing the color encoding function of encoder 20. While buried subcarrier encoding is preferred when the processor of FIG. 1 is used as a video disc mastering signal source, it is not essential to the present invention. The principles of the present invention apply to high band and low band color formats as well as to the BSC format. Also, other color subcarrier choices such as 1.52 MHz or 2.29 MHz may be more appropriate when processing PAL format signals in buried subcarrier form.

Frame store 50 is similar in many respects to conventional storage units used for frame synchronization in television studio applications (see, for example U.S. Pat. Nos. 4,101,926 and 4,110,785 which issued July 18, 1978 and Aug. 10, 1978, respectively) and may be implemented by modifying a conventional frame synchronizer as described in the aforementioned Ross Patent Application. As previously mentioned, a commercially available synchronizer suitable for this purpose is the model TFS-121 "VIDEO FRAME SYNCHRONIZER" sold by RCA Corporation.

Frame store 50 comprises an analog-to-digital (A/D) converter 52 for converting the composite video signal S1 to digital form for application to a two field memory 54 and a digital-to-analog (D/A) converter 56 for reconverting the signal back to analog form. In the type TFS-121 synchronizer the A/D converter output is bit serial and a serial-in parallel-out (SIPO) buffer is used to convert the signal to a word organized form (8 bit) for storage in memory 54. A parallel-in serial-out (PISO) buffer is then used for reconverting the memory output to serial form for D/A converter 56. A/D converter 52 receives a sampling signal $f_s$ from an output of input clock generator 58 which is synchronized with timing signals supplied by generator 12. A preferred value of $f_s$ is 4fsc, wherein fsc is the NTSC color burst frequency. Clock generator 58 also supplies a write clock signal $f_c$ to read/write controller 60 and to the input of divider circuit 62 which divides $f_c$ by two. This represents the "slow down" factor of the processing system and equals the number of identical fields in each set of redundant fields produced by the slow motion tape recorder. For other slow down rates the division factor of divider 62 should be appropriately selected (e.g., 3 for a one third rate mastering system). The resultant timing signal (reduced by the factor 2) is applied to the input of the output clock generator 64 which, in turn, supplies a reduced rate sampling signal ($f_s/2$) to D/A converter 56 via a chroma inverter circuit 40 and a reduced rate clock signal ($f_c/2$) to read/write controller 60. As will be explained in more detail subsequently, inverter 40 (when activated) effectively inverts the phase of the recovered chroma signal relative to regenerated burst by delaying the sampling signal $f_s/2$ by a length of time equivalent to one half cycle of the regenerated color subcarrier.

The aforementioned Ross patent gives specific examples of how to select fields such that those which are stored form a proper NTSC color field sequence (i.e., odd, 0°; even, 0°; odd 180°; even 180°) when recovered from the memory 54 of the frame store. For the illustrated example of the present invention, the selection is controlled by the write select signal S2 applied to read/write controller 60. S2 is derived from the sync correction or field change control signal that is normally used for correcting vertical sync in the slow motion tape recorder when the slow down factor, N, is equal to 2. Generation of S2 for "half rate" or other slow down factors is described in more detail in the Ross application.

Video timing signals (e.g., sync, and burst) are not stored in the memory since they are predictable repetitive functions. Rather, they are added to the output of D/A converter 56 by means of burst-sync combiner 70 to thereby provide a composite video output signal at output terminal 71. It is conventional practice in storing digitized video signals to reinsert timing signals which are rephased replicas of the original timing signals. Here, however, the reinserted timing signals are related to the redundancy level, N, of the input video signal. (As used herein, redundancy level means the number of replications of a given field produced by the selected slow motion recorder before the video head is advanced to the next field). Specifically, burst and sync are added to the output of D/A converter 56 at 1/Nth of their original respective periods. For half rate (N=2) mastering of BSC encoded video, the burst is reinserted at a frequency of 765 KHz (1.53 MHz/2), vertical synchronizing pulses are added at a repetition rate of about 30/sec (one half the NTSC standard field rate) and horizontal synchronizing pulses are added at 127 microsecond intervals.

The reduced rate vertical and horizontal synchronizing signals ($f_v/2$, $f_h/2$) are derived from the NTSC timing signal produced by generator 12 by means of sync regenerator 72. Burst-sync combiner 70 includes a gate responsive to the regenerated horizontal synchronizing signal ($f_h/2$) produced by sync regenerator 72 for gating the color subcarrier reference signal S3 produced by color subcarrier regenerator 74 prior to addition thereof to the recovered luminance and chrominance signals and the regenerated sync signals. The gate is enabled during the so called "back porch" interval of the horizontal sync pulse for a period of time twice as long as in the NTSC standard. Since the gate time is increased by the same factor, 2, as the regenerated subcarrier is reduced in frequency, the output burst signal includes the same number of cycles (3-4) as in normal (real time) rate BSC encoded composite video signals.

Color subcarrier regenerator 74 may be implemented by dividing the output of the regenerator in the model TFS-121 frame synchronizer by the slow down factor (2 in this case) and periodically resetting the divider by means of the color frame identification signal S4 produced by recorder 10 to maintain a consistent phase relationship between the divider output signal and the chrominance signal recovered from memory 54. A preferred color subcarrier regenerator is described in the U.S. Patent Application of M. D. Ross and J. K. Clemens entitled "COLOR SUBCARRIER REGENERATOR FOR SLOW DOWN PROCESSOR" Ser. No. 190,277 filed Sept. 24, 1980. The Ross-Clemens regenerator additionally includes heterodyning circuitry responsive to the reference subcarrier component (fsc) of the video timing signal produced by signal generator 12 and to the burst component (fbsc) of the encoded video signal for automatically compensating for phase changes in the regenerated subcarrier S3 which may occur due to cable length differences when switching between different tape recorders and/or color encoders.

Control of the phase relationship of the chrominance and regenerated color burst components of the reproduced video output signal is provided by chroma inverter 40 comprising a phase shifter 42 and a switch 44. Switch 44 is controlled by a control signal S5 and, in its normal or unactivated condition, directly couples the sampling signal fs/2 produced by generator 64 to D/A converter 56. When activated by control signal S5, switch 44 couples the sampling signal fs/2 to converter 56 via phase shifter 42. The phase shifter imparts a delay to the converter sampling signal fs/2 equal to one half cycle of the regenerated color subcarrier fbsc/2. Illustratively, for a half rate buried subcarrier signal frequency of 765 KHz (fbsc/2), the delay provided by phase shifter 42 would be on the order of 653 nanoseconds. Delaying of the sampling signal fs/2 in this manner results in delayed reading of the stored chrominance signal and has the effect of inverting the phase of the chrominance component of the composite video signal recovered from memory 54 thereby reversing the chroma-burst phasing of the output signal at terminal 71.

An advantage of achieving chroma-burst phase reversal by delay of the D/A converter sampling or "read control" signal as described above is that no additional elements need be added directly to either the chroma signal path or the regenerated color subcarrier signal path. This reduces to a great extent the probability of occurrence of differential gain or phase errors which otherwise might be produced if an additional element (e.g., an inverting amplifier or a four quadrant multiplier) were added to the chrominance signal path to achieve phase inversion. An additional advantage is that the chrominance signal phase is effectively reversed without the need for separating the chrominance and luminance components of the composite video signal thereby eliminating other sources of potential gain and phase errors (i.e., filters).

Yet another advantage of inverter 40 is that since it alters the chrominance signal phase without disturbing the phase of the regenerated color subcarrier signal S3, burst phase continuity of the output signal at terminal 71 is maintained. In other words, the regenerated burst phase is consistent and independent of the state (activated or unactivated) of switch 44. As a result, when a video disc record (mastered by the signal at terminal 71) is played back, the color oscillator of the TV receiver or monitor will maintain phase lock with the color burst signal. This would not be the case if one were to correct phase flips by simply reversing burst phasing.

Generation of the signal S5 which controls inverter 40 is provided by error detector 30 which includes a keyed phase comparator 31 for detecting anomalous variations of the chrominance-burst phase relationship of the redundant field video signal S1 produced by recorder 10. The keying signal for detector 31 is provided by a vertical interval detector 32 having an input connected to the output of encoder 20 for receiving the composite video signal S1 and an output coupled to the keying (i.e., enabling) input of comparator 31 via a delay element 33. The delay of element 33 (which may comprise a delay line or a multivibrator) is selected such that comparator 31 is enabled or keyed during a selected line of the vertical interval of signal S1 (illustratively, line 16).

The "active video" portion of line 16 of signal S1 includes a reference signal which is recorded on the tape played by recorder 10 at a specific phase angle relative to the color burst component of S1. A preferred reference signal would be a sine wave of color burst frequency having a phase angle relative to burst corresponding to the color blue. For NTSC program material this would correspond to an angle of about 180 degrees relative to the B-Y axis which would be in phase with burst. It is also preferable that the amplitude of the reference signal be relatively large so that if line 16 were viewed on a TV monitor the signal would appear to be a line of highly saturated blue. The reason for this preference is that line 16 may be viewable on some television receivers or monitors which are "underscanned" (i.e., have less than normal raster height) and a line of dark blue tends to be less distracting from a viewer stand point than less saturated colors of different hues.

The signal S1 produced by encoder 20 is applied directly to one phase comparison input of comparator 31 and to the input of a color burst locked oscillator 34. The oscillator (which may be a conventional phase locked loop) produces a reference frequency signal S6 locked in phase with the burst component of S1 and supplies the reference frequency signal S6 to the other phase comparison input of comparator 31. During line 16 comparator 31 is enabled, as previously described, and produces an output signal S7 representative of the phase relationship of the "line of blue" reference component of S1 and the color burst component (S6) of S1.

If a playback error should occur which would cause a reversal of the burst and chrominance phasing of S1 then the signal S7 will assume a level that will prime gate 35. If the phase error occurs at the same time that the write select signal S2 is of a value to enable writing of the field into memory 54 then gate 35 will be enabled thereby providing an indication signal S8 that the stored field has a reversed chroma-burst phase relationship. The occurrence of the signal S8 then triggers multivibrator 36 which, in turn, generates the signal S5 that corrects the potential "phase flip" of the processor output signal by reversing the phase of the chrominance component of the output signal relative to that of regenerated burst component as previously described.

The quasi-stable state of multivibrator 36 is selected to equal the period of one "slowed down" field produced by the processor which, in this example, would be about 1/30 of a second. Accordingly, the chroma-burst phasing of all lines of the field subsequent to line 16 will be corrected whereupon multivibrator 36 will return to its stable state until the next potential phase flip condition is sensed by phase comparator 31.

What is claimed is:

1. A slow down processor, comprising:
    tape recorder means operable in a slow motion playback mode for producing a redundant field composite video signal comprising sequential sets of fields, each field being produced at a standard field rate, each set of fields comprising a predetermined number of similar fields, each field normally having a predetermined chrominance-burst phase relationship but being subject to anomalous reversals of said chrominance-burst phase relationship;
    frame storage means, responsive to said redundant field video signal and to a field storage selection signal produced by said tape recorder means, for storing a selected field of each set of fields and for reproducing the stored selected fields at a field rate less than said standard field rate to provide a non-redundant field video output signal of reduced bandwidth, said frame storage means being of a type in which the color burst component of composite video signal supplied thereto is not stored but is regenerated by color subcarrier regenerator means and added by adder means to the reproduced video output signal;

error detector means responsive to first and second sequential components of said redundant field composite video signal for detecting said anomalous reversals of said chrominance-burst phase relationship and producing a control signal, said error detector means including means responsive to said first component for producing a reference signal having an overlapping time relationship with said second component, phase comparison means responsive to said reference signal and to said second component for producing a phase reversal indicating signal and output means responsive to said phase reversal indicating signal for producing said control signal for a predetermined period of time substantially equal to N times the length of one field of said redundant field composite video signal, N being equal to said predetermined number, vertical interval detector means having an input coupled to receive said redundant field composite video signal and an output for providing a vertical interval identification signal and control circuit means responsive to said vertical interval signal for enabling said phase comparison means solely during a selected line of the vertical interval of said redundant field composite video signal; and circuit means responsive to said control signal for effectively reversing the phase relationship of the chrominance and regenerated color burst components of said non-redundant field video output signal of said frame storage means when said control signal is present.

2. A slow down processor as recited in claim 1 further comprising means for applying said field storage identification signal to said error detector means for enabling said error detector means in response to a first level of said field storage identification signal and for disabling said error detector means in response to a second level of said field storage identification signal.

3. A slow down processor as recited in claim 1 wherein said circuit means for reversing the phase relationship of the chrominance and regenerated color burst components comprises chrominance signal inverter means coupled to said frame storage means and responsive to said control signal for effectively reversing the phase of said chrominance component of said non-redundant field video output signal when said control signal is present without alteration of the phase of said regenerated color burst component.

4. A slow down processor as recited in claim 3 wherein said chrominance signal inverter means comprises:
- delay means;
- a signal path in said frame storage means for conducting read clock signals; and
- circuit means responsive to said control signal for interposing said delay means in said signal path when said control signal is present.

* * * * *